Sept. 21, 1948. I. S. ROBERTS 2,449,954
SLIDE RULE
Filed March 26, 1945 2 Sheets-Sheet 1
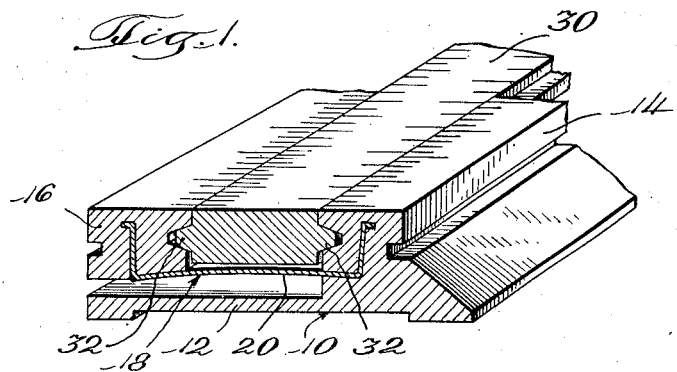
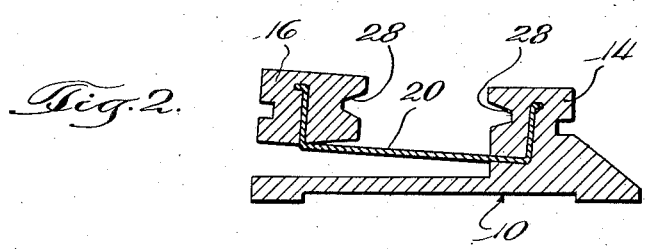
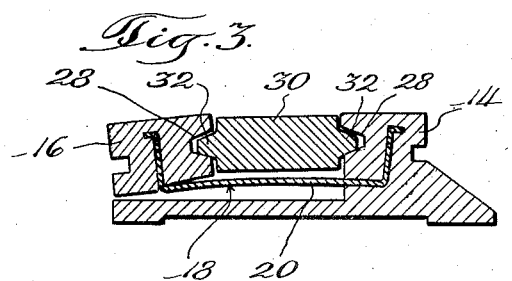
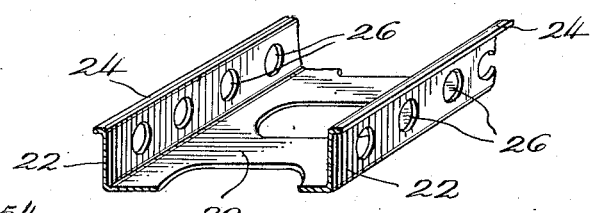
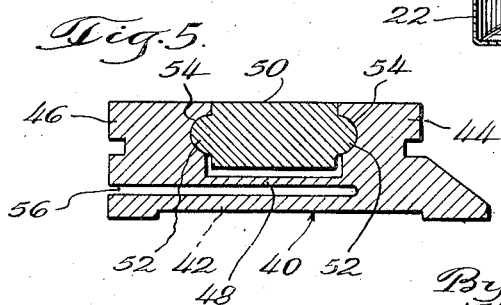
Inventor
Ingham S. Roberts
By Williams, Bradbury & Hinkle
Attorneys

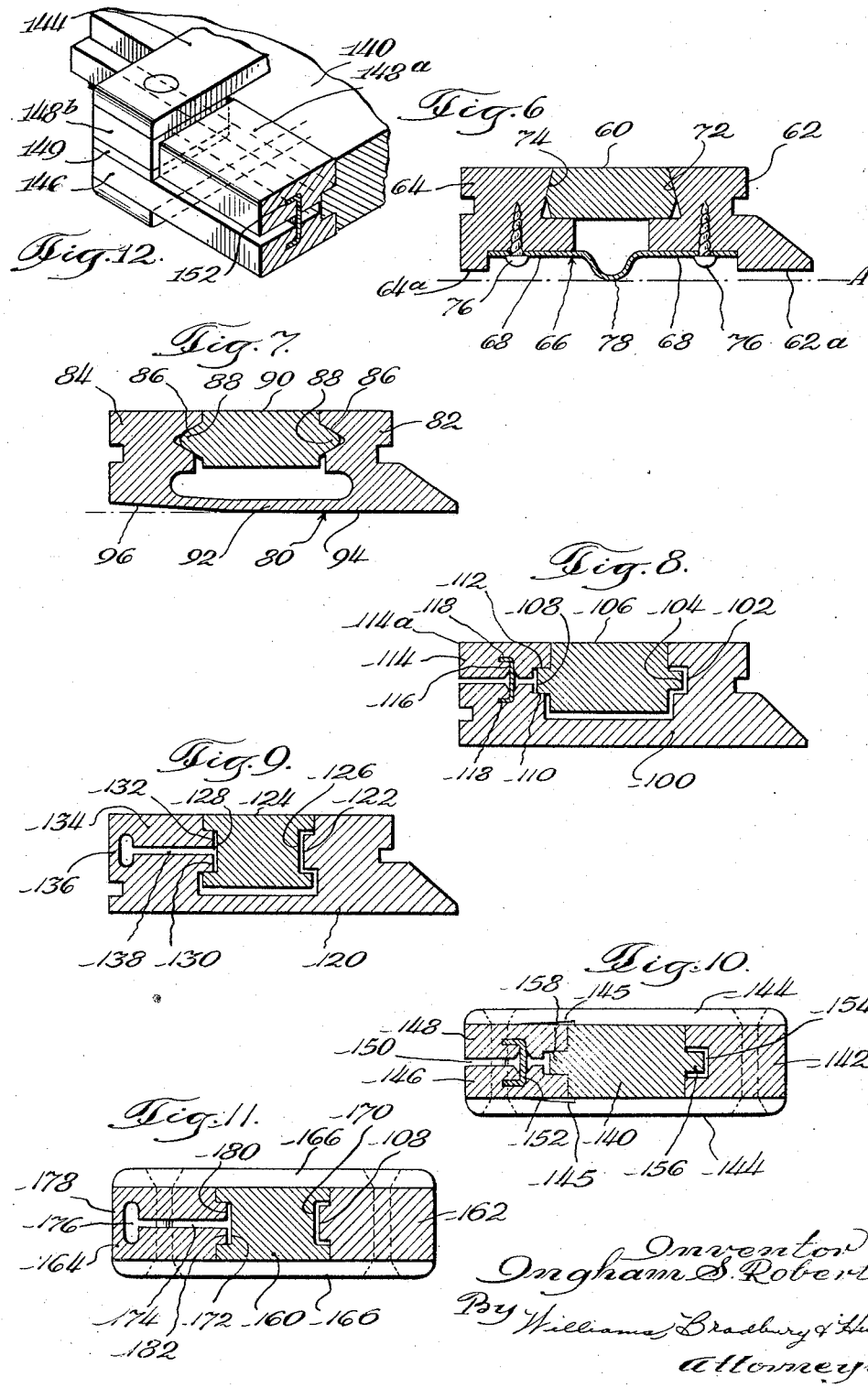
Sept. 21, 1948.     I. S. ROBERTS     2,449,954
SLIDE RULE
Filed March 26, 1945     2 Sheets-Sheet 2

Patented Sept. 21, 1948

2,449,954

UNITED STATES PATENT OFFICE 2,449,954

SLIDE RULE

Ingham S. Roberts, Ridley Park, Pa.

Application March 26, 1945, Serial No. 584,813

11 Claims. (Cl. 235—70)

This invention relates to slide rules and is particularly concerned with the mounting and guidance of the slidable member of such a rule.

It is well known that the ease, speed and accuracy with which a slide rule can be operated depend upon the amount and uniformity of the force required to move the slide. If this force is too great or too variable, the slide is difficult to set; if the frictional resistance to motion of the slide is too small, there is danger of an error due to failure of the slide to hold its position after being set. Heretofore, the amount and uniformity of slide resistance to motion in slide rules have been regulated frictionally by various methods, as for example: by accurately forming a snug fit between the slide and the frame, or by slightly springing the slide or the sides of the frame so that the force which neutralizes this springing increases the sliding friction, or as a variant of this method, springing the web of the frame below the slide so that the slide is lightly clamped by the sides of the frame, or by supplemental means such as special springs for imposing a frictional resistance to motion upon the slide, or adjustable means for varying the frictional resistance by moving and setting one side of the frame relative to the other or adjusting the force of the spring or springs which are employed to control friction. All of these methods have disadvantages. It is expensive to manufacture and difficult to adjust such instruments to secure the best results from frictional resistance; even with careful manufacture the friction usually varies with the position of the slide in the frame and it definitely varies with changes in atmospheric humidity and also by reason of wear of the instrument itself. Even under the best conditions there is a small amount of friction between the slide and the frame which is provided in order to prevent errors due to slipping, and even this small amount is objectionable in that it increases the difficulty of quickly and accurately setting the slide.

It is therefore an object of this invention to provide a new and improved slide rule in which the slide is arranged for substantially frictionless motion in obtaining any setting thereof but in which means is provided for firmly holding the slide against movement at other times.

Another object of the invention is to provide a new and improved slide rule in which the main frame or body is formed with a guideway for the slide member, said guideway comprising portions which normally exert a frictional grip upon the slide but which are yieldingly held in gripping position and are instantly releasable to permit free adjustment of the slide.

It is also an object of the invention to provide a new and improved slide rule having guideways for the slide and in which at least one of the guideways is yieldingly held in position to grip the slide member frictionally but is so mounted that a slight pressure applied externally to the frame or body of the rule will release the frictional grip to allow free movement of the slide.

Other objects and advantages of the invention will appear from the following description of several forms or embodiments of the invention taken in connection with the accompanying drawings illustrating the same, in which:

Fig. 1 is a fragmentary perspective view of a slide rule embodying the invention taken partly in transverse section and showing the slide as normally held frictionally at any adjusted position;

Fig. 2 is a transverse section similar to the sectional portion of Fig. 1 showing the frame or body portion of the slide rule with the parts in the relative positions assumed when the slide is removed;

Fig. 3 is a transverse section showing in somewhat exaggerated fashion the position assumed by the parts for release of the frictional grip of the guideways to permit free movement of the slide;

Fig. 4 is a detail perspective view partly in section showing a fragment of the spring member employed to connect the guide portions of the slide rule shown in Figs. 1, 2, and 3;

Fig. 5 is a transverse sectional view of a slide rule in which the resilience of the frame or body portion provides the yielding character of the guideway;

Fig. 6 is a transverse section showing another modification in which two portions of the guideway are connected by a spring member on which the rule rests in normal position;

Fig. 7 is a transverse section of a further modification in which the material of the frame or body provides a yielding connection between portions of the guideway and having a specially formed base to facilitate release of the slide;

Fig. 8 is a transverse sectional view showing another form of the invention in which one side of the guideway for the slide is formed of two parts connected by a spring member;

Fig. 9 is a transverse sectional view of a further modification in which the material of the base provides the yielding connection between two portions of the guideway at one side of the slide;

Fig. 10 is a transverse section of a slide rule of the double-faced type, showing a construction similar to that of Fig. 8 applied thereto;

Fig. 11 is a transverse section of a slide rule of the double-faced type, showing an arrangement similar to that of Fig. 9;

Fig. 12 is a fragmentary perspective detail showing a modification of Fig. 10.

In Figs. 1 to 9 the invention is illustrated as applied to the Mannheim type of slide rule in which the graduations of the fixed member are on the upper surface of said member which is designed to lie upon the surface of a desk or table when in use; the slide is usually graduated on both faces and is reversible in the fixed member. As shown in Fig. 1, the frame or body 10 includes a base 12 with a guide portion 14 substantially rigid therewith and a second guide portion 16 which is connected to the part 14 by a spring member 18. As seen in Fig. 4, the spring member includes a flexible and resilient web portion 20 with flanges 22 disposed substantially at right angles to the web 20 and formed with lips 24 at their free edges. It may be assumed that the parts 12, 14, and 16 are moulded preferably of synthetic plastic material in which the spring member 18 can be imbedded during the moulding process so that its flanges 22 will be firmly and permanently secured in the parts 14 and 16 with the lips 24 and perforations 26 serving to perfect this anchorage. The portion of the web 20 which is left exposed may have a normally flat form as seen in Fig. 2 in which the guideway grooves 28, 28 in the parts 14 and 16 respectively are shown open toward each other ready to receive the slide 30.

Insertion of the slide member 30 with its guide tongues 32 entered in the grooves 28, forces the parts 14 and 16 into the position shown in Fig. 1 in which their upper and graduated surfaces lie in a common plane with the upper surface of the slide member 30 while the web 20 of the spring connector 18 is slightly flexed. This change in relative position of the guide members 14 and 16 increases the distance between their guideways 28, 28 so that the spring member 18 reacts with sufficient force to cause the slide 30 to be frictionally gripped between the parts 14 and 16; thus it is held firmly at any adjusted position.

With the top surfaces of the parts 14, 16 and 30 in a common plane, guide member 16 is spaced above the base portion 12 of the frame and is held yieldingly in this position by the spring 18. To release the frictional hold of the parts 14 and 16 upon the slide 30 it is only necessary to depress the member 16 slightly. This causes the web 20 of the spring member 18 to be flexed to a greater degree than in its holding position as shown in Fig. 1 so as to increase the distance between the guide grooves 28, 28. Fig. 3 illustrates this action but shows the member 16 depressed much farther than necessary for merely releasing the frictional grip of the guide grooves 28, 28 upon the tongue portions 32, 32 of the slide 30, the release movement being exaggerated in this view merely to clarify the effect of such an adjustment of the part 16. In practice, a very slight downward movement of the member 16 from its position shown in Fig. 1 will be sufficient to relieve the pressure normally exerted upon the slide 30 and permit it to be freely adjusted. When the slide has been moved to the desired position, the finger pressure on the part 16 is removed allowing it to spring into gripping position so as to hold the slide 30 firmly until another adjustment is to be made.

Fig. 5 shows a slightly modified construction in which the frame or body 40 includes a base portion 42 and an integral guide portion 44. The opposite guide portion 46 also is integral with the frame, being connected to the part 44 by a relatively thin web 48 which functions in much the same manner as the spring 18 of Fig. 1. It may be understood that this structure will also be moulded of plastic material and that in the original moulding operation the part 48 will be given a position in which it is somewhat divergent from the part 42. Then when the slide member 50 is inserted with its guide tongues 52 engaging in the guide grooves 54, the web 48 will be sprung into the position shown in Fig. 5 and will react to provide the desired friction for gripping the slide 50 at adjusted position. The clearance space 56 between the portion 46 and the base 42 will permit the part 46 to be slightly depressed whenever the slide 50 is to be released for adjustment to a new position.

In Fig. 6 the slide member 60 is shown gripped between guide members 62 and 64 which are connected by one or more spring members 66 to form the frame or body of the rule. This construction may be made of wood if desired; that is, it is not necessarily moulded of plastic material. The spring element 66 will be initially made with its wing portions 68, 68 disposed in planes somewhat oblique to each other so that when these portions are brought into a common plane by insertion of the slide 60 as shown in Fig. 6, the spring will react to pinch the slide 60 between the guide surfaces 72 and 74 of the parts 62 and 64 respectively. The wing portions 68 of the spring member 66 are shown secured to parts 62 and 64 by means of screws 76, but if preferred it will be recognized that these wing portions might be moulded in the parts 62 and 64 if the latter were made of plastic material.

The middle portion 78 of the spring 66 is bent downward slightly below the plane of the bottom surfaces 62a and 64a of the parts 62 and 64 so that when the slide rule rests upon a flat surface as indicated by the broken line A in Fig. 6, a slight pressure upon the upper faces of the parts 62 and 64 will flex the spring 66 upon its depressed portion 78 as a fulcrum and will thus separate the guide surfaces 72 and 74 so as to relieve their frictional grip on the slide member 60 and permit free adjustment of the slide. Release of the finger pressure on the parts 62 and 64 instantly restores the parts to gripping position to maintain adjustment of the slide 60.

Fig. 7 shows a one-piece frame 80 adapted to function in the same manner as the structure shown in Fig. 6. The frame includes guide portions 82 and 84 having guide grooves 86, 86 which engage the tongue portions 88 of the slide member 90. The web 92 which forms the middle portion of the base of the frame is relatively thin and the bottom of the frame includes a flat surface 94 on which the rule normally will rest and a surface 96 disposed at a slight angle to the plane of the surface 94 so that simultaneous pressure upon the upper portions 82 and 84 will tend to flex the thin portion 92 of the base and separate the guide grooves 86, 86 sufficiently to release the frictionally held slide member 90. In this form, as in the case of that shown in Fig. 5, the portion 92 will be initially moulded with the surface 96 at a greater angle to the plane of the surface 94 so that insertion of the slide 90 serves to spread the parts 82 and 84 and produce a stress in the thin web 92 resulting in the frictional gripping of the slide 90 between the guide portions 82 and 84.

Fig. 8 illustrates a somewhat different application of the principle of the invention. In this construction the base 100 includes a guide groove 102 which provides a permanent running fit for the tongue 104 of the slide member 106. The opposite tongue 108 of the slide is engaged between the guide surface 110 formed in the base member 100 and the guide surface 112 formed in a separate member 114. The member 114 is connected to the base member 100 by a resilient channel-shaped member 116 which may be of spring metal or other suitable material and which has anchorage flanges 118 so that it may be permanently secured in the base member 100 and in the member 114 when these parts are moulded, preferably of plastic material. The initial form of the spring member 116 will be such that the tongue 108 is frictionally gripped between the surfaces 110 and 112 but to release this hold the part 114 may be rocked slightly by pressure upon its outer edge 114a, thus tilting the surface 112 outwardly just enough to permit the slide 106 to be moved freely as desired. Removal of the pressure at 114a will cause the spring 116 to return the part 114 to gripping position.

In Fig. 9 the base 120 of the slide rule is provided with a tongue 122 serving as one side of the guideway for the slide 124 and the slide itself has a groove 126 dimensioned as a permanent running fit for the tongue 122. The groove 128 at the opposite side of the slide 124 is occupied by the tongue 130 of the base member 120 and the tongue 132 of an integral portion 134 which is attached to the base by a part 136 of relatively thin cross section extending throughout the length of the rule. A clearance space 138 between the base 120 and the portion 134 permits the part 134 to be depressed to relieve the frictional grip of its tongue 132 against the side of the groove 128 in the slide, such depression of the part 134 being permitted by the resilience of the material in the web 136. In this case, the pressure will be applied to the edge of the part 134 adjacent the slide 124 instead of at the outer edge as in Fig. 8.

Fig. 10 shows a construction quite similar to that of Fig. 8 for applying the same principle to a slide rule of the double-faced type. In such a rule the slide member is mounted between guide members and the guide members are connected at their ends by plates riveted thereto and overlapping the upper and lower faces of the slide and the guides.

Fig. 10 shows the slide member 140 with one of the guide members at 142 and with the connecting plates 144. The opposite guide member consists of two parts 146 and 148 respectively which are separated by a space 150 and connected by a spring channel member 152 similar to the member 116 of Fig. 8. The part 142 has a slot 154 formed as a running fit for the tongue 156 of the slide 140, while the tongue 158 of the slide is gripped between the parts 146 and 148. However, these parts may be slightly separated by pinching their outer edges together or toward each other and thus flexing the connecting element 152 so as to release the member 140 for sliding adjustment. To permit the resulting rocking movement of the parts 146 and 148 the plates 144 may be formed with clearance notches as shown at 145 adjacent the inner edges of said parts of the two-part guide member.

The rule shown in Fig. 11 embodies the principle of Fig. 9 as applied to the double-faced rule and includes a slide member 160 carried between guide members 162 and 164 which are tied together in the usual way by plates 166. The member 162 includes a tongue 168 formed as a running fit in the groove 170 of the slide 160. The opposite groove 172 engages a split tongue formed on the guide member 164. The tongue is split by reason of a slot 174 and extending longitudinally in the member 164 together with a communication channel 176 which provides a portion 178 of relatively thin cross section opposite the inner end of the slot 174. Initially, the part 164 will be moulded with the walls of the slot 174 diverging so that when the rule is assembled the two parts 180 and 182 of the tongue which fits the groove 172 will be sprung slightly to fit the groove and will exert sufficient friction against the side walls thereof to hold the slide 160 at adjusted position. This friction may be relieved by pinching the part 164 adjacent the edges of the slide 160, thus disengaging the tongue portions 180 and 182 from the sides of the groove 172.

It may be understood that in Figs. 8, 9, 10, and 11 the clearance between the tongue-and-groove features at the right side of each figure is greatly exaggerated and is intended to indicate merely a free running fit since there is no adjustment between the tongue and groove at this side of the slide rule.

It may be further noted that in the other forms of the invention shown in Figs. 1 to 7 inclusive, in which the slide is released by a tilting of one of the guide members as it separates from the other guide, the tongues formed on each of the slide members have outwardly converging side walls and the grooves of the guideways have outwardly diverging side walls to prevent any binding between the tongue-and-groove features by reason of the change in angular position of the movable guideway. This is true of all the forms except that shown in Fig. 6 and, actually, the same principle is involved in that structure; in this case the flat bottom wall of the slide serves as a guide surface adjacent each lateral edge of the slide. These bottom surfaces of the slide ride upon flat guideway surfaces which lie in a common horizontal plane and which cooperate with the surfaces 72 and 74 which extend at acute angles to the bottom guide surfaces. Thus each guideway has outwardly divergent guide surfaces and the cooperating guide surfaces of the slide are outwardly convergent like the guide tongues of the slides shown in the other figures. In all these forms, therefore, the slightest separation of the two guide portions of the fixed scale member relieves the tapering guide surfaces of the slide from the divergent guide grooves of the fixed members and prevents the binding which would result if the tongues were formed with parallel guide faces like those of Figs. 8 to 11.

In the construction shown in Figs. 10 and 11 instead of requiring any play between the rivets of the end plates and the rockable parts 148 and 178 a slightly different arrangement may be employed as indicated in Fig. 12, which is a modification of the structure of Fig. 10. The upper part of the two-piece guide member is shown at 148a with its end portion 148b cut free and clamped firmly under the upper plate 144 with a filler 149 interposed between the portion 148b and the lower part 146. This leaves the part 148a connected to the part 146 only by the element 152 and thus permits it to be rockably adjusted for releasing the slide 140. The guideway in the fixed end portion 148b is made with enough clearance to insure easy operation. It will be evident that the same type of construction can be employed for the form of the invention shown in Fig. 11 instead of relying upon any clearance between the parts 178 and 164 and the rivets by which the plates 166 are secured thereto.

It will be seen that an incidental advantage of my invention is that nearly all the forms thereof which are herein shown and described may be operated with one hand if desired, leaving the other hand free for holding a magnifying glass when securing a very accurate setting or for noting the computations which are made with the aid of the rule. If thus used the rule will lie on the desk or table and the fixed member will be held in position with one or two fingers or with the base of the palm so that the necessary slight pressure can be exerted for releasing the slide. The slide can then be manipulated by one finger of the same hand.

In the figures of the drawing the usual transparent slider which is movably mounted on the fixed member of the rule has been omitted; it will be understood that the slider will have sufficient play in its guideway and will have a take-up spring of sufficient range to permit of the slight movements of one side of the fixed member required for releasing the slide in accordance with this invention. It may also be noted that in the forms shown in Figs. 10 and 11 the rivets which connect the plates 144 and 166 of these forms respectively will have a very slight amount of play in the two-part guide portions through which they pass so as to permit the slight rocking movements of the parts required for releasing the slide.

While there is shown and described herein certain structure embodying the invention, it is to be understood that the invention is not limited thereto or thereby but may assume numerous other forms and includes all modifications, variations and equivalents coming within the scope of the following claims.

I claim:

1. A slide rule comprising a slide and a fixed scale member which comprises a base portion with a fixed guideway formed thereon for one side of the slide, a movable guideway for the opposite side of the slide, said base portion extending beneath the movable guideway, and a flexible resilient support extending from the fixed guideway and carrying the movable guideway normally spaced above the base and normally in frictional engagement with the slide, whereby flexure of said support toward the base swings said movable guideway away from the fixed guideway, releasing the slide for free movement between them.

2. A slide rule comprising a slide, a fixed scale member which comprises a pair of opposed guideways for the slide, means rigid with one of said guideways and forming a base underlying the second guideway and flexible and resilient means normally holding said guideways in frictional engagement with the slide, said base forming means providing a fulcrum so that said second guideway is separable from the slide by a substantially arcuate movement which withdraws its guide surface from the cooperating surface of the slide, leaving said surfaces spaced apart to permit free movement of the slide with respect to the fixed scale member.

3. A slide rule comprising a slide and a fixed scale member which includes a base portion with a fixed guideway formed thereon for one side of the slide, a movable guideway for the opposite side of the slide, and a flexible resilient supporting portion extending integrally from the fixed guideway and spaced above the base, said resilient support carrying the movable guideway normally in frictional engagement with the slide, whereby flexure of said support toward the base swings the movable guideway away from the fixed guideway, releasing the slide for free movement between them.

4. A slide rule comprising a slide, a fixed scale member which comprises a pair of opposed guideways for the slide, means rigid with one of said guideways and forming a base underlying the second guideway, and flexible resilient means interconnecting said guideways below the slide and holding them normally in frictional engagement therewith releasable by flexure of said resilient connection, said slide and guideways having inter-engaging portions shaped so as to separate freely upon such flexure of the resilient connection.

5. A slide rule comprising a slide and a fixed scale member which includes a fixed guideway for one side of the slide and a two-part guideway for the other side of the slide, the slide and said two-part guideway having interengaging tongue-and-groove guide means, the guide means of the two-part guideway having a pair of oppositely facing guide surfaces normally in frictional contact with cooperating surfaces of the slide, and a resilient connection at a distance from said guide surfaces adapted to be flexed to alter the distance between said surfaces, thereby releasing the slide for free movement relative to the fixed scale member.

6. A slide rule comprising a slide and a fixed scale member which includes a fixed guideway for one side of the slide and a two-part guideway for the other side of the slide, the slide having a tongue, and said two-part guideway forming a groove for said tongue with oppositely facing guide surfaces normally in frictional contact with the tongue, the two-part guideway including a resilient connection at a distance from the guide surfaces of the groove adapted to be flexed to alter the width of the groove and thereby release the slide for free movement relative to the fixed scale member.

7. A slide rule comprising a slide and a fixed scale member which includes a fixed guideway for one side of the slide and a two-part guideway for the other side of the slide, the slide having a groove, and said two-part guideway comprising a tongue having oppositely facing guide surfaces normally in frictional contact with opposite sides of the groove, and a resilient connection between the two parts of said tongue at a distance from its said guide surfaces and adapted to be flexed to alter the distance between said surfaces, reducing the width of the tongue and releasing the slide for free movement relative to the fixed scale member.

8. A slide rule comprising a slide and a fixed scale member which includes a fixed guideway for one side of the slide and a two-part guideway for the other side of the slide, said slide and said two-part guideway having interengaging tongue-and-groove guide means, and the guideway comprising an upper part and a lower part connected by a vertically extending flexible and resilient web normally holding said tongue-and-groove guide means in frictional engagement but yieldable when pressure is applied to said upper part to alter the distance between opposite surfaces of one of the guide means to release the slide for free movement relative to the fixed scale member.

9. A slide rule comprising a slide and a fixed scale member which includes a fixed guideway for one side of the slide and a two-part guideway for the other side of the slide, the slide in said two-part guideway having interengaging tongue-and-groove guide means, said two-part guideway comprising an upper part and a lower part spaced apart and connected by a vertically extending flexible and resilient web upon which the upper part is tiltable at will with respect to the lower part to release the guide means of the slide.

10. A slide rule comprising a slide and a fixed scale member which includes a base portion with a fixed guideway formed thereon for one side of the slide, a movable guideway for the opposite side of the slide, and a flexible resilient support extending from the fixed guideway and carrying the movable guideway normally spaced above the base and normally in frictional engagement with the slide, the slide and guideways having interengaging tongue-and-groove guide means in which the side walls of the grooves are outwardly divergent and the side walls of the tongues are outwardly convergent to insure free separation of said guide, whereby flexure of said support toward the base swings the movable guideway away from the fixed guideway, releasing the slide for free movement between them.

11. A slide rule comprising a slide and a fixed scale member which comprises a base portion with a fixed guideway formed thereon for one side of the slide, said fixed guideway including upper and lower surfaces fixedly spaced from each other and adapted to engage respectively the upper and lower edges of a slide, a movable guideway for the opposite side of the slide, said base portion extending beneath a movable guideway, flexible means connecting said movable guideway normally spaced above the base and normally in frictional engagement with the slide whereby flexure of said support swings the movable guideway away from engagement with said slide, releasing the slide for free movement between them, said resilient support constituting the sole resilient means incorporated in said fixed scale member.

INGHAM S. ROBERTS.

REFERENCES CITED

The following references are of record in the file of this patent:

UNITED STATES PATENTS

| Number | Name | Date |
|---|---|---|
| 1,329,902 | Hemmi | Feb. 3, 1920 |
| 1,790,569 | Asper | Jan. 27, 1931 |

FOREIGN PATENTS

| Number | Country | Date |
|---|---|---|
| 226,773 | Germany | Oct. 7, 1910 |
| 468,323 | Great Britain | July 2, 1937 |